United States Patent Office 3,591,693
Patented July 6, 1971

3,591,693
COMPOSITIONS AND METHOD FOR TREATING MYCOBACTERIUM TUBERCULOSIS WITH 2,4,6-TRIS(ALKYLAMINO)-s-TRIAZINE
Margot Louise Cantrall, New City, Martin Leon Sassiver, Monsey, and Robert Gordon Shepherd, South Nyack, N.Y., assignors to American Cyanamid Company, Stamford, Conn.
No Drawing. Filed May 22, 1969, Ser. No. 827,031
Int. Cl. A61k 27/00
U.S. Cl. 424—249
10 Claims

ABSTRACT OF THE DISCLOSURE

This disclosure describes compositions of matter useful for the treatment of Mycobacterium tuberculosis infections in warm-blooded animals and the method of treating Mycobacterium tuberculosis infections in warm-blooded animals therewith, the active ingredients of said compositions of matter being certain 2,4,6-tris(alkylamino)-s-triazines.

BRIEF SUMMARY OF THE INVENTION

This invention relates to novel compositions of matter useful for the treatment of Mycobacterium tuberculosis infections in warm-blooded animals. More particularly, it relates to therapeutic compositions containing certain 2,4,6-tris(alkylamino)-s-triazines useful for the treatment of Mycobacterium tuberculosis infections in warm-blooded animals. The invention includes the new compositions of matter and the method of treating Mycobacterium tuberculosis infections in warm blooded animals therewith.

Our invention is based upon the discovery that certain 2,4,6-tris(alkylamino)-s-triazines possess excellent activity as antimycobacterial agents. The 2,4,6-tris(alkylamino)-s-triazines of the present invention may be represented by the following general formula:

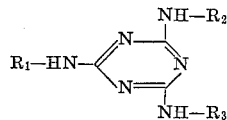

wherein $R_1$ is normal alkyl of from 1 to 8 carbon atoms, secondary alkyl of from 4 to 8 carbon atoms, tertiary alkyl of from 4 to 11 carbon atoms, lower cycloalkyl or methyl substituted lower cycloalkyl; $R_2$ is secondary alkyl of from 4 to 8 carbon atoms, tertiary alkyl of from 4 to 11 carbon atoms, lower cycloalkyl or methyl substituted lower cycloalkyl; and $R_3$ is secondary alkyl of from 4 to 8 carbon atoms, tertiary alkyl of from 4 to 11 carbon atoms, lower cycloalkyl or methyl substituted lower cycloalkyl.

DETAILED DESCRIPTION OF THE INVENTION

Suitable secondary alkyl groups of from 4 to 8 carbon atoms contemplated by the present invention are, for example, sec-butyl, 2-pentyl, 2-hexyl, 2-heptyl, 2-octyl, 3-pentyl, 3-hexyl, 3-heptyl, 4-heptyl, 3-octyl, 4-octyl, 3-methyl-2-butyl, 3,3-dimethyl-2-butyl, 3-methyl-2-pentyl, 4-methyl-2-pentyl, 3-ethyl-2-pentyl, 3,3-dimethyl-2-pentyl, 3,4-dimethyl-2-pentyl, 4,4-dimethyl-2-pentyl, 3,3,4-trimethyl-2-pentyl, 2-methyl-3-pentyl, 2,2-dimethyl-3-pentyl, 5-methyl-2-hexyl, 4-ethyl-2-hexyl, 3,3-dimethyl-2-hexyl, 3,4-dimethyl-2-hexyl, 3,5-dimethyl-2-hexyl, 4,5-dimethyl-2-hexyl, 5,5-dimethyl-2-hexyl, 4-methyl-3-hexyl, 5-methyl-3-hexyl, 4-ethyl-3-hexyl, 4,4-dimethyl-3-hexyl, 5,5-dimeth-yl-3-hexyl, 6-methyl-2-heptyl, 6-methyl-3-heptyl, 6-methyl-4-heptyl, etc. Suitable tertiary alkyl groups of from 4 to 11 carbon atoms contemplated by the present invention are, for example, tert-butyl, tert-pentyl, 2-methyl-2-pentyl, 2-methyl-2-hexyl, 2-methyl-2-heptyl, 2,3-dimethyl-2-butyl, 2,3,3-trimethyl-2-butyl, 2,3-dimethyl-2-pentyl, 2,4-dimethyl-2-pentyl, 2,3,3-trimethyl-2-pentyl, 2,4,4-trimethyl-2-pentyl, 3-methyl-3-pentyl, 3-ethyl-3-pentyl, 2,3-dimethyl-2-hexyl, 2,4-dimethyl-2-hexyl, 2,5-dimethyl-2-hexyl, 3-methyl-3-hexyl, 3-ethyl-3-hexyl, 3,4-dimethyl-3-hexyl, 3,5-dimethyl-3-hexyl, 3-methyl-3-heptyl, 4-methyl-4-heptyl, 3-ethyl-3-octyl, etc. Suitable lower cycloalkyl groups are cyclopentyl, cyclohexyl, cycloheptyl and cyclooctyl. Suitable methyl substituted lower cycloalkyl groups are, for example, 1-methylcyclopentyl, 2,5-dimethylcyclopentyl, 3,4-dimethylcyclopentyl, 1-methylcyclohexyl, 2,6-dimethylcyclohexyl, 2,4,6-trimethylcyclohexyl, 1-methylcycloheptyl, 2,7-dimethylcycloheptyl, 4,5-dimethylcycloheptyl, 1-methylcyclooctyl, 2,8-dimethylcyclooctyl, 2,5,8-trimethylcyclooctyl, and the like.

Typical compounds of the present invention include, for example, $N^2$-ethyl-$N^4$-(3,3-dimethyl-2-pentyl)-$N^6$-(5,5-dimethyl-2-hexyl)melamine,
$N^2$-t-butyl-$N^4$-(3-methyl-2-butyl)-$N^6$-(3-ethyl-3-pentyl) melamine,
$N^2$-n-hexyl-$N^4$-tert-pentyl-$N^6$-(2,3-dimethyl-2-butyl)melamine,
$N^2$-sec-butyl-$N^4$-(4-hexyl)-$N^6$-(2-octyl)melamine,
$N^2$-(3-pentyl)-$N^4$-(4-octyl)-$N^6$-(3-methyl-3-pentyl)melamine,
$N^2$-(3-heptyl)-$N^4$-(3,5-dimethyl-3-hexyl)-$N^6$-(2,3,3-trimethyl-2-pentyl)melamine,
$N^2$-(2,3-dimethyl-2-pentyl)-$N^4$-(5-methyl-3-hexyl)-$N^6$-(4-ethyl-3-hexyl)melamine,
$N^2$-(2,4-dimethyl-2-pentyl)-$N^4$-3,4-dimethyl-2-pentyl)-$N^6$-(2,3,3-trimethyl-2-butyl)melamine,
$N^2$-(4-methyl-4-heptyl)-$N^4$-(2,3-dimethyl-2-hexyl)-$N^6$-(3-methyl-3-heptyl)melamine,
2,4,6-tris(3,7-dimethylcyclooctylamino)-s-triazine,
2,4,6-tris(3,6-dimethylcycloheptylamino)-s-triazine,
$N^2$-n-propyl-$N^4$-(2,3-dimethyl-2-pentyl)-$N^6$-(1-methylcyclooctyl)melamine,
$N^2$-tert-butyl-$N^4$,$N^6$-di(1-methylcycloheptyl)melamine,
$N^2$-(3-ethyl-3-pentyl)-$N^4$-(3,3-dimethyl-2-butyl)-$N^6$-(2,5-dimethylcyclopentyl)melamine,
$N^2$-(cyclohexyl)-$N^4$-(1-methylcyclohexyl)-$N^6$-(2,4,6-trimethylcyclohexyl)melamine, and the like.

The 2,4,6-tris(alkylamino)-s-triazines of the present invention are colorless, crystalline or glass-like solids at room temperature and are relatively insoluble in water but soluble in many organic solvents such as ethanol, acetone, dimethylformamide, and the like.

The 2,4,6-tris(alkylamino)-s-triazines of the present invention form non-toxic acid-addition salts with a variety of organic and inorganic salt-forming reagents. Thus, acid-addition salts, formed by admixture of the melamine base with an acid, suitably in a neutral solvent, are formed with such acids as sulphuric, phosphoric, hydrochloric, hydrobromic, trifluoroacetic, and related acids. For purposes of this invention, the $N^2,N^4,N^6$-tris(alkyl)melamines are equivalent to their non-toxic acid-addition salts.

The 2,4,6-tris(alkylamino)-s-triazines of the present invention may be readily prepared from cyanuric chloride and an appropriate normal alkylamine, secondary alkylamine, tertiary alkylamine, lower cycloalkylamine or methyl substituted lower cycloalkylamine in accordance with the following reaction scheme:

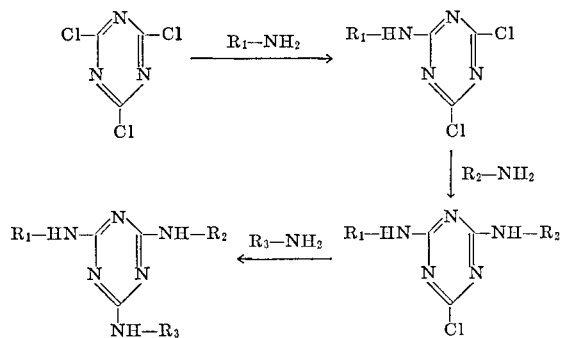

wherein $R_1$, $R_2$, and $R_3$ are as hereinabove defined. When $R_1$, $R_2$, and $R_3$ are all different, the substitution of the alkylamino groups at the 2-, 4- and 6-positions is carried out stepwise as indicated in the above reaction scheme employing equimolar amounts of alkylamine and cyanuric chloride or 2,4-dichloro-6-alkylamino-s-triazine in the first two steps and an excess of alkylamine and 2-chloro-4,6-bis(alkylamino)-s-triazine in the final step. The substitution of the alkylamino groups need not be carried out in the order shown in the above reaction scheme but may be carried out in any order. When two of the alkyl groups are the same, then two molecular equivalents of an alkylamine are reacted with cyanuric chloride followed by treatment of the intermediate 2-chloro-4,6-bis(alkylamino)-s-triazine with an excess of the other alkylamine. Alternatively, when two of the alkyl groups are the same, one molecular equivalent of an alkylamine is reacted with cyanuric chloride followed by treatment of the intermediate 2,4-dichloro-6-alkylamino-s-triazine with an excess of the other alkylamine. When $R_1$, $R_2$, $R_3$ are the same, then cyanuric chloride is treated with an excess of the appropriate alkylamine to produce the corresponding $N^2$, $N^4$, $N^6$-tris(alkyl)melamine.

The above reactions may be carried out in an inert solvent such as toluene or xylene for a period of time of from about 3 hours to 24 hours or more at temperatures ranging from about 25° C. to about 200° C. In addition, α-pyridone may be employed as catalyst in solvents or as a reaction medium. Variation in the reaction time and temperature is dependent upon the structure of the alkylamine reagent; n-alkylamines reacting most readily whereas tertiary alkylamines react with difficulty. When one or two molecular equivalents of alkylamine are used, then an acid scavenger such as sodium bicarbonate, soda ash, or a tertiary amine such as diisopropylethylamine should be employed to take up the hydrochloric acid produced in the reaction. In those cases where an excess of alkylamine may be used, then an acid scavenger and/or an inert solvent may be dispensed with.

The preparation of symmetrical 2,4,6-tris(alkylamino)-s-triazines (where $R_1=R_2=R_3$) may also be carried out by reacting cyanuric chloride with an excess of an alkylamine in dilute aqueous sodium hydroxide or potassium hydroxide at the reflux temperature for a period of time of from about 3 hours to about 48 hours. The preparation of symmetrical 2,4,6-tris(alkylamino)-s-triazines (where $R_1=R_2=R_3=R$) may also be accomplished by the trimerization of alkylcyanamides, R—NHCN. In all cases, the products may be separated from the reaction mixtures and purified by standard techniques well known to those skilled in the art.

The 2,4,6-tris(alkylamino)-s-triazines of the present invention are active against *Mycobacterium tuberculosis* H37Rv infections in mice when tested in accordance with the following procedure. Carworth Farms CF1 white mice, females, 4 to 6 weeks old, weighing 17 to 22 grams, are infected with *Mycobacterium tuberculosis* H37Rv by administration intravenously of 0.2 ml. of a buffered saline suspension containing approximately 1.5 mg. per ml. wet weight of a 12 to 14 day culture of the test organism grown on Sauton's agar medium. Routinely, 200–300 mice are given this standard infection and then segregated in a random manner into cages each of which holds five or ten mice. Four groups of five mice each are retained as untreated controls, and the remaining mice are used to ascertain activity of compounds under test. During a one year experience with this test, the standard infection defined above caused a 99.5% mortality, in that 756 of the 760 infected untreated control mice died within 30 days, the normal period of the test.

A measured amount of each compound to be tested is administered orally incorporated in a Standard Diet to groups of infected mice for 14 days, after which the mice are fed untreated Standard Diet. Control animals receive untreated Standard Diet for the entire test period and all animals are allowed to feed at will. Tests are terminated 28 days after the day of infection. A compound is judged active if it either saves 2 or more of the 5 mice in a test group in two tests or prolongs average survival time by 4 or more days compared to untreated controls.

The Standard Diet used in this test procedure is a commercial feed designed for laboratory mice and rats composed of the following ingredients: Animal liver meal, fish meal, dried whey, corn and wheat flakes, ground yellow corn, ground oat groats, dehulled soybean meal, wheat germ meal, wheat middlings, cane molasses, dehydrated alfalfa meal, soybean oil, brewers' dried yeast, irradiated dried yeast (source of vitamin $D_2$), riboflavin, niacin, calcium panthothenate choline chloride, vitamin A palmitate, D-activated animal sterol, α-tocopherol, dicalcium phosphate, thiamine hydrochloride, menadione sodium bisulfite (source of Vitamin K activity), salt and traces of: manganese oxide, copper sulfate, iron carbonate, potassium iodate, cobalt sulfate, and zinc oxide. The said commercial feed has the guaranteed analysis as containing a minimum of 24.0% crude protein, a minimum of 4.0% crude fat and a maximum of 4.5% crude fiber and is sold under the trademark Wayne Lab-Blox ® by Allied Mills, Inc., Chicago, Ill. In the test procedure described hereinabove, the Standard Diet into which measured amounts of the test compounds had been homogeneously incorporated was administered to infected test animals, whereas untreated Standard Diet was given to infected control animals.

In a representative operation, and merely by way of illustration, the following compounds of the present invention are active in this test procedure at the indicated oral dose as set forth in Table I below:

TABLE I

| Compound | Percent compound in diet | Alive/total mice tested 28 days after infection |
|---|---|---|
| 2,4,6-tris(tert-butylamino)-s-triazine | 0.1 | 5/5 |
|  | 0.05 | 5/5 |
| 2,4,6-tris(2,4,4-trimethyl-2-pentylamino)-s-triazine | 0.2 | 5/5 |
|  | 0.1 | 5/5 |
|  | 0.05 | 5/5 |
|  | 0.025 | 2/5 |
| 2,4,6-tris(tert-pentylamino)-s-triazine | 0.4 | 5/5 |
|  | 0.1 | 4/5 |
|  | 0.2 | 5/5 |
|  | 0.05 | 5/5 |
| 2-(2-octylamino)-4,6-bis-(2,4,4-trimethyl-2-pentylamino)-s-triazine | 0.4 | 5/5 |
|  | 0.1 | 3/5 |
|  | 0.025 | 0/5 |
| 2-(tert-pentylamino)-4,6-bis(2,4,4-trimethyl-2-pentylamino)-s-triazine | 0.1 | 5/5 |
|  | 0.05 | 5/5 |
| 2-methylamino-4,6-bis(2,4,4-trimethyl-2-pentylamino)-s-triazine | 0.4 | 4/5 |
|  | 0.1 | 1/5 |
|  | 0.025 | 0/5 |
| 2,4,6-tris(3-ethyl-3-pentylamino)-s-triazine | 0.4 | 5/5 |
|  | 0.1 | 5/5 |
|  | 0.025 | 3/5 |
| 2,4,6-tris(cyclohexylamino)-s-triazine | 0.1 | 5/5 |
|  | 0.05 | 5/5 |
| 2,4,6-tris(cyclopentylamino)-s-triazine | 0.4 | 5/5 |
| 2,4,6-tris(1-methylcyclohexylamino)-s-triazine | 0.4 | 5/5 |
|  | 0.1 | 5/5 |

NOTE.—Infected, non-treated controls: 100/100 mice died with an average survival time of 19 days.

The 2,4,6-tris(alkylamino)-s-triazines and their nontoxic acid-addition salts of the present invention have thus been found to be highly useful for the treatment of *Mycobacterium tuberculosis* infections in warm-blooded animals when administered in amounts ranging from about 5 mg. to about 200 mg. per kg. of body weight per day. A preferred dosage regimen for optimum results would be from about 10 mg. to about 100 mg. orally per kg. of body weight per day, and such dosage units are employed that a total of from about 0.5 g. to 10.0 g. of active ingredient for a subject of about 70 kg. are administered orally in a 24 hour period.

The dosage units of active compound may contain other inert or medically active materials, for instance, when the dosage unit form is a tablet, pill or granules, there may also be present various binders, fillers or solid diluents. Suitable materials for this purpose may be, for example, starch such as corn starch, or sugar such as lactose or sucrose. There may also be present various medically active materials, for example, p-amino salicylic acid. When the dosage unit form is a capsule, it may contain in addition to materials of the above type a liquid carrier such as a fatty oil. The dosage unit form may also have present various flavors, oil of wintergreen, and excipients such as dicalcium phosphate. Various other materials may be present as coatings or to otherwise modify the physical form of the dosage unit, for instance, pills or capsules may be coated with shellac, sugar or both. Of course, any material used in preparing the dosage unit form should be pharmaceutically pure and substantially non-toxic in the amounts employed.

The following examples illustrated the preparation of typical 2,4,6-tris (alkylamino)-s-triazines of the present invention.

EXAMPLE 1

Preparation of $N^2,N^4,N^6$-tris(tert-butyl)melamine

A mixture of 4.4 g. (0.02 mole) of 2,4-bis(tert-butylamino)-6-chloro-s-triazine, 3.1 g. (0.042 mole) of tert-butylamine (and 4.6 g. (0.06 mole) of α-pyridone was refluxed for 5 hours (reflux temperature ranged from 70–120° C.), cooled and quenched with 20 ml. of 5 N sodium hydroxide. Filtration and washing with water gave 5.2 g. of crude product, M.P. 148–160° C., cloudy. The crude product was dissolved in hot ethanol (ethanol insoluble material removed by filtration). The cooled solution was diluted with water causing precipitation of 2.5 g. of product, M.P. 176–178° C.

EXAMPLE 2

Preparation of $N^2,N^4,N^6$-tris(tert-pentyl)melamine

A mixture of 2.8 g. (0.01 mole) of 2-chloro-4,6-bis-(tert-amylamino)-s-triazine, 1.3 g. (0.015 mole) of tert-amylamine and 2.8 g. (0.03 mole) of α-pyridone was refluxed for 3.5 hours and kept at a pot temperature of about 160° C. for an additional 2 hours and then cooled to a gel. The gel was treated with dilute sodium hydroxide causing an insoluble oil to separate which solidified on standing. Filtration of this mixture afforded 3.79 g. of crude product, M.P. 93–106° C. The crude product was dissolved in hot ethanol, cooled and filtered in order to remove a small amount of a high-melting by-product. The ethanol filtrate was treated with water until the cloudpoint was reached and then placed in a refrigerator for several hours. On filtration, 2.1 g. of product was obtained as white crystals, M.P. 106–108° C., corr.

EXAMPLE 3

Preparation of $N^2,N^4,N^6$-tris(2,4,4-trimethyl-2-pentyl)melamine

A mixture of 3.7 g. (0.01 mole) of 2,4-bis(2,4,4-trimethyl-2-pentylamino)-6-chloro-s-triazine, 2.6 g. (0.02 mole) of 2,4,4-trimethyl-2-pentylamine and 2.85 g. (0.03 mole) of α-pyridone are fused and heated at the boiling point for 2½ hours during which time the mixture turns a brown color. At the end of this period the mixture is cooled yielding a solid mass which is treated with about 10 ml. of 10% sodium hydroxide. On filtration, 4.52 g. of a beige solid is obtained, M.P. 151–156° C. Recrystallization of the beige solid from 75 ml. of hot ethanol yields 3.09 g. of colorless needles, M.P. 156–157.5° C.

EXAMPLE 4

Preparation of $N^2$-(2-octyl)-$N^4,N^6$-bis(2,4,4-trimethyl-2-pentyl)-melamine 18.5 grams (0.05 mole) of 2,4-bis(2,4,4-trimethyl-2-pentylamino)-6-chloro-s-triazine and 14.2 g. (0.11 mole) of 2-octylamine are slurried in water containing 2.0 g. (0.05 mole) of sodium hydroxide and two drops of phenolphthalein. The mixture is heated to reflux. Disappearance of pink color indicates reaction is taking place and small amounts of sodium hydroxide are added over a period of 2 to 3 hours to maintain a slightly alkaline mixture. The mixture is refluxed for an additional 18 hours. The cooled mixture is then extracted with benzene. The benzene extract is washed with aqueous alkali, dried over anhydrous magnesium sulfate and concentrated to a viscous oil by distillation under aspirator pressure. The residue was then acidified with 20 milliliters 5 N ethanolic hydrogen chloride. The acid solution was concentrated to a gel, treated with 20 milliliters 10 N NaOH and extracted into benzene. Concentration of the benzene extract furnished 15.3 g. of the product, a pale yellow syrup.

EXAMPLE 5

Preparation of $N^2$-(tert-pentyl)-$N^4,N^6$-bis(2,4,4-trimethyl-2-pentyl)melamine A mixture of 5.55 g., (0.015 mole) of 2,4-bis(2,4,4-trimethyl-2-pentylamino)-6-chloro-s-triazine, 3.87 g. (0.03 mole) of tert amylamine and 4.3 g. (0.045 mole) of α-pyridone are refluxed for 8 hours. At the end of this period the mixture was cooled and treated with about 15 ml. of 10 N sodium hydroxide. A viscous oil separates and solidifies on standing. The solid is separated by filtration and washed with water giving 7.36 g. of crude beige solid. This solid is dissolved in 100 ml. of hot ethanol. Insoluble material is removed by filtration and 25 ml. of water is added to the filtrate. An oily product separates and solidifies on standing. Filtration affords 4.3 g. of the substituted melamine, M.P. 120–122° C.

EXAMPLE 6

Preparation of $N^2$-methyl-$N^4,N^6$-bis(2,4,4-trimethyl-2-pentyl)melamine

A mixture of 5.0 g. (0.014 mole) of 2-chloro-4,6-bis-(2,4,4-trimethyl-2-pentylamino)-s-triazine and 17.4 g. (0.56 mole) of methylamine bubbled into 50 ml. of water is heated in a Parr bomb at 100 C. for 48 hours. At the end of this period the mixture is filtered and affords 4.82 g. of crude product. Recrystallization of the crude product from hexane and cooling in the refrigerator overnight yields 3.3 g. of white product, M.P. 124–128° C.

EXAMPLE 7

Preparation of $N^2,N^4,N^6$-tris(3,3-dimethyl-2-butyl)melamine

A solution of 8.4 g. (0.21 mole) of sodium hydroxide in 40 ml. of water is slowly added to a slurry of 28.2 g. (0.28 mole) of 3,3-dimethyl-2-aminobutane and 12.9 g. (0.07 mole) of cyanuric chloride in 100 ml. of of water as to maintain a slightly alkaline mixture. The mixture is heated at reflux for 3 hours, cooled to room temperature overnight and filtered, yielding 27 g. of crude product after drying. The product is recrystallized from a mixture of acetone-water, using a large amount of water, 20.9 grams of water-insoluble product is collected, M.P. 104–117° C.

EXAMPLE 8

Preparation of $N^2,N^4,N^6$-tris(3-ethyl-3-pentyl)melamine 26.5 grams (0.023 mole) of 3-ethyl-3-pentylamine is added to 4.6 g. (0.025 mole) of cyanuric chloride with cooling. The mixture is heated at reflux for 23 hours, cooled and treated with excess dilute aqueous alkali. The organic layer is extracted into chloroform (3× 50 ml.). The extracts are combined, dried over anhydrous magnesium sulfate and concentrated to an amber gum. Treatment of the gum with ethanol and water initiates the crystallization of a beige solid which is separated by filtration, weight 12.6 g. Two recrystallizations from hot ethanol yield 5.86 g. of colorless needles, M.P. 73–780° C. after drying in an evacuated desiccator over $P_2O_5$ for 24 hours and followed by drying in a vacuum oven at 48° C. for 36 hours.

EXAMPLE 9

Preparation of 2-n-propylamino-4,6-bis(3,3-dimethyl-2-butylamino)-s-triazine

A solution of 0.2 mole of cyanuric chloride in 80 ml. of hot acetone was stirred into 175 ml. of ice-cold water. This slurry was then treated with 0.2 mole of n-propylamine and 0.2 mole of 10 N sodium hydroxide solution. After stirring for one hour at 5° C. or below, 0.4 mole of 3,3-dimethyl-2-butylamine and 0.4 mole of 5 N sodium hydroxide solution were added. During heating at reflux for 4 hours, the mixture was kept alkaline. After cooling and filtering, the crude product was recrystallized from acetone-water.

EXAMPLE 10

Preparation of 2-methylamino-4-(2,4,4-trimethyl-2-pentylamino)-6-(3,3-dimethyl-2-butylamino)-s-triazine To 170 ml. of ice-cold water was added 0.2 mole of cyanuric chloride in 80 ml. of hot acetone with stirring, forming a slurry. This slurry was treated with 0.2 mole of methylamine followed by 0.2 mole of 5 N sodium hydroxide solution. After stirring for 1 hour at below 5° C., 0.2 mole of 2,4,4-trimethyl-2-pentylamine was added. After the exotherm, the mixture was heated at reflux and 0.2 mole (or more as required) of 5 N sodium hydroxide added so as to keep the mixture alkaline to phenolphthalein during 17 hours heating. Then 0.2 mole of 3,3-dimethyl-2-aminobutane was added along with an equivalent of sodium hydroxide and the heating continued for 3 hours. After cooling, the crude product was separated by filtration and recrystallized from acetone-water.

EXAMPLE 11

Preparation of 2-tert-butylamino-4-(3-ethyl-3-pentylamino)-6-(2,4,4-trimethyl-2-pentylamino)-s-triazine A slurry was produced by stirring into 170 ml. of ice-cold water 0.2 mole of cyanuric chloride in 80 ml. of hot acetone. t-Butylamine (0.2 mole) and 0.2 mole of 5 N sodium hydroxide were added and the mixture kept below 20° for about 1 hour. 3-ethyl-3-pentylamine (2.0 mole) was added and the mixture heated to boiling. While refluxing for 17 hours, 0.2 mole of 5 N sodium hydroxide was added so as to maintain alkalinity. After cooling, the white solid was recovered by filtration and dried. This material was added to 100 ml. of refluxing 2,4,4-trimethyl-2-pentylamine and heating continued for 5 hours. The product was recovered by pouring into aqueous acetone and recrystallized from hexane.

EXAMPLE 12

Preparation of 2,4-bis(2-octylamino)-6-tert-octylamino-s-triazine

Cyanuric chloride (0.05 mole in 20 ml. of hot acetone) was added with stirring to 45 ml. of ice-cold water. To the resulting slurry was added 7.1 g. (0.055 mole) of 2,4,4-trimethyl-2-pentylamine followed by 0.05 mole of 10 N sodium hydroxide solution. After stirring for about one hour, 14.2 g. (0.11 mole) of 2-octylamine and 0.12 mole of 10 N sodium hydroxide solution are added. The mixture is heated to reflux and kept alkaline by addition of sodium hydroxide as required during 18 hours. The product is isolated as described in Example 4.

EXAMPLE 13

Preparation of 2,4,6-tris(2,4,6-trimethylcyclohexylamino)-s-triazine

A solution of 5.54 g. (0.03 mole) of cyanuric chloride in 50 ml. of xylene was added dropwise at 0–5° C. to a solution of 17 g. (0.12 mole) of 2,4,6-trimethylcyclohexylamine and 20.6 ml. (0.12 mole) of diisopropylethylamine in 150 ml. of xylene. After 16 hours of refluxing, ethyl acetate was added to the xylene and this solution was extracted with water, dried and evaporated to a gum. Pure product was obtained by converting this gum to a monohydrochloride. Partition chromatography separated this hydrochloride of the desired product from any unconverted base. Trituration of the chromatographically obtained product with water gave a white powder, M.P. 120–130° C., analytically pure.

EXAMPLE 14

Preparation of 2,4,6-tris(cyclooctylamino)-s-triazine

A solution of 5.53 g. (0.03 mole) of cyanuric chloride in 50 ml. of xylene was added at 0–5° C. to a solution of 30.5 g. (0.24 mole) of cyclooctylamine in 150 ml. of xylene. After a reflux period of 16 hours the xylene was washed with water, dried and evaporated to 11.5 g. of crude product. Recrystallization from ethanol gave pure material, 10.5 g., M.P. 153–155° C.

EXAMPLE 15

Preparation of 2,4,6-tris(cyclopentylamino)-s-triazine

This compound was prepared by the procedure used for the tris-cyclooctyl analog (Example 14), substituting cyclopentylamine (0.24 mole, 20.4 g.) for the cyclooctylamine. A crude yield of 7.7 g. was obtained, which was recrystallized from ethanol to give 4.4 g., M.P. 137–140° C.

EXAMPLE 16

Preparation of 2,4-bis(cyclohexylamino)-6-(2,4,6-trimethylcyclohexylamino)-s-triazine A solution of 5.53 g. (0.03 mole) of cyanuric chloride in 50 ml. of xylene was added dropwise at 0.5° C. to a solution of 4.25 g. (0.03 mole) of 2,4,6-trimethylcyclohexylamine and 2.6 g. (0.03 mole) of diisopropylethylamine in 150 ml. of xylene, and the solution was refluxed for 16 hours. Then 5.94 g. (0.06 mole) of cyclohexylamine was added and the solution was refluxed for 16 hours. The xylene was washed with water, dried and evaporated to yield the desired product.

EXAMPLE 17

Preparation of 2-cyclohexylamino-4,6-bis(1-methylcyclohexylamino)-s-triazine

This compound was made by utilizing 2 molar equivalents of 1-methylcyclohexylamine instead of 2,4,6-trimethylcycohexylamine in the preceding Example 16. The final amination is then carried out with just 1 molar equivalent of cyclohexylamine instead of 2.

EXAMPLE 18

Preparation of 2,4-bis(cyclohexylamino)-6-(2,4,4-trimethyl-2-pentylamino)-s-triazine This compound was prepared similarly to the one described in Example 16 except that t-octylamine was used in place of 2,4,6-trimethylcyclohexylamine.

EXAMPLE 19

Preparation of 2,4-bis(2,4,4-trimethyl-2-pentylamino)-6-cyclohexylamino-s-triazine The procedure used for this compound was similar to that of Example 16, using cyclohexylamine instead of 2,4,6-trimethylcyclohexylamine and in the second step, using t-octylamine instead of the cyclohexylamine of Example 16.

EXAMPLE 20

Preparation of 2,4,6-tris(sec-butylamino)-s-triazine

A mixture of 2.5 g. (0.01 mole) monochloro-bis(sec-butylamino)-s-triazine, 2.85 g. (0.03 mole) α-pyridone and 1.5 g. (0.02 mole) sec-butylamine (2 ml.) were heated for 5 hours. The mixture was cooled and treated with dilute aqueous alkali. The beige solid was filtered to give 3.1 g. of crude product M.P. 67–76° C. Two recrystallizations from hot hexane gave 2.65 g. of off-white solid M.P. 86–96° C.

EXAMPLE 21

Preparation of 2,4,6-tris(2-octylamino)-s-triazine

A mixture of 18.5 g. (0.1 mole) cyanuric chloride, 39 g. (0.3 mole) 2-amino octane in 100 ml. of water was heated to reflux. 60 ml. of 5 N NaOH was added slowly so as to maintain a slightly alkaline reaction mixture. The mixture was allowed to cool overnight and then extracted with benzene. Evaporation of the benzene extract which was dried over anhydrous $Na_2CO_3$ left a viscous oil, 18.4 g. The oil was treated with 20 ml. of 5 N ethanolic HCl, the mixture filtered to remove some insolubles and the filtrate concentrated in vacuo and the residue treated with 20 ml. 5 N NaOH. Extraction into benzene, drying over anhydrous $Na_2CO_3$, and concentration left a pale yellow oil, 13.0 g.

EXAMPLE 22

Preparation of 2-n-octylamino-4,6-bis(2,4,4-trimethyl-2-pentyl)-amino-s-triazine 4.6 g. (0.013 mole) of 2-chloro-4,6-bis(2,4,4-trimethyl-2-pentyl)amino-s-triazine and 5.0 g. (0.029 mole) n-octylamine were stirred in water containing a few drops of phenolphthalein solution and the mixture was gradually heated to reflux. Aqueous NaOH was added so as to maintain a slightly alkaline mixture. The mixture was refluxed overnight (19 hours), cooled and filtered to give 6.3 g. of crude product. This was dissolved in hot ethanol (some insoluble high melting oxo compound removed by filtration) and diluted with water to give a white solid, M.P. 74–78° C. This was dissolved in heptane, (some more insoluble oxo compound removed) and the filtrate concentrated to a gel which on treatment with 50% aqueous ethanol gave a white solid which was dried in a vacuum oven for 3 hours at 45° C. giving 5.1 g. of product, M.P. 74–77° C.

EXAMPLE 23

Preparation of 2,4,6-tris(3-ethyl-3-octylamino)-s-triazine 21.2 g. (0.135 mole) of 3-amino-3-ethyl octane was added to 2.8 g. (0.015 mole) of cyanuric chloride and the mixture heated at reflux for 3 hours. The cooled reaction mixture was treated with excess 5 N NaOH and the insoluble base extracted into chloroform, dried over anhydrous $K_2CO_3$ and concentrated to an oil in vacuo, 21.1 g. The oil was treated with 25 ml. 6 N HCl giving a water insoluble gum which was triturated several times with water and then treated with excess 5 N NaOH. The free base was extracted into chloroform, dried and concentrated to an oil, 14.2 g. 6.5 g. of excess 3-amino-3-ethyl amine was collected by distillation at 84–86° C./17–20 mm. The residue in the distilling flask was treated with excess 3 N HCl, the insoluble gum washed with water, and then treated with excess NaOH and extracted with benzene. The benzene extract was dried over anhydrous $K_2CO_3$, decolorized (orange-yellow) with Darco and concentrated to a viscous yellow oil, 5.7 g.

EXAMPLE 24

Preparation of 2,4,6-tris(2-methyl-2-heptylamino)-s-triazine 2-amino-2-heptylamine (34.8 g., 0.27 mole) was added to (5.5 g., 0.03 mole) cyanuric chloride with slight cooling. The combined reagents were then heated at reflux for 5 hours, treated with excess alkali and extracted into chloroform (3 × 25 ml.), the extract dried over anhydrous $MgSO_4$ and then concentrated in vacuo to a viscous oil, 16.1 g. To remove any remaining amine the oil was triturated with dilute acid 3 times and then treated with base, extracted into chloroform, dried and concentrated to a viscous yellow-orange oil, 12.6 g. The oil was dissolved in acetone, water added to the cloud point and cooled in Dry Ice acetone bath. A gum separated which did not crystallize and hence was reextracted into benzene, dried and concentrated to a yellow viscous oil representing 12.6 g. of product.

EXAMPLE 25

Preparation of 2,4,6-tris(2,3-dimethyl-2-butyl)amino-s-triazine

A solution of 5.5 g. (0.03 mole) cyanuric chloride, 10.9 g. (0.108 mole) 2,3-dimethyl-2-butylamine and 11.7 g. (0.09 mole) diisopropylethyl amine in 150 ml. of xylene was refluxed for 24 hours. The cooled mixture was treated with excess aqueous NaOH and the xylene layer separated. The aqueous phase was extracted into chloroform and the combined chloroform-xylene layer dried over anhydrous $K_2CO_3$ and concentrated to a crude brown solid was treated with ethanol and water and filtered to give 8.2 g. of a crude mixture of monochloro and tris-substituted amino-s-triazine. This was combined with an additional 4.6 g. (0.046 mole) 2,3-dimethyl-2-butylamine and 7.5 g. (0.081 mole) α-pyridone and refluxed for 2 hours. The cooled reaction mixture was treated with excess 1 N NaOH and a solid separated. Filtration afforded 8.9 g. of crude product. This was dissolved in hot ethanol giving a dark brown solution which was treated with norite, filtered and cooled. Addition of water to the filtrate caused precipitation of light brown solid, M.P. 108–120° C., 6.6 g. (Thin layer chromatography indicated presence of two components.) The material was chromatographed on a partition column of Celite-heptane methyl Cellosolve. A clean separation of the two components was accomplished giving the desired melamine as a white solid, M.P. 139–140° C.

EXAMPLE 26

Preparation of 2,4,6-tris(4-methyl-4-heptyl)amino-s-triazine 4-methyl-2-heptyl amine 18.0 g. (0.14 mole) was added to cyanuric chloride 2.8 g. (0.015 mole) and the mixture heated at reflux for 5 hours. The reaction mixture was treated with excess alkali and extracted into chloroform. The chloroform extract was concentrated leaving a viscous liquid. This was treated with aqueous 6 N HCl and the beige gum washed with water and dilute HCl which were decanted. The gum was treated with excess alkali, extracted into $CHCl_3$ and the chloroform extract dried and concentrated to a viscous oil-gum, 6.3 g. Thin layer chromatography indicated the presence of several minor impurities and starting amine. The crude product was chromatographed on a column of silica gel G using hexane and chloroform. Concentration of chloroform washes gave the pure melamine as a pale yellow oil.

EXAMPLE 27

Preparation of 2-chloro-4,6-bis(2,3,3-trimethyl-2-butylamino)-s-triazine 6.7 g. (0.044 mole) 2,3,3-trimethyl-2-butylamine hydrochloride and 3.4 g. (0.84 mole) NaOH in 20 ml. water were added to a stirred slurry of 3.6 g. (0.02 mole) cyanuric chloride in 150 ml. water. The reaction mixture was heated at reflux for 2½ hours, cooled and filtered to give the product, a white solid, M.P. 129–131° C., 6.5 g.

EXAMPLE 28

Preparation of 2,4,6-tris(2,3,3-trimethyl-2-butyl)amino-s-triazine 3.3 g. (9.6 mmole) of 2-chloro-4,6-di(2,3,3-trimethyl-2-butyl)amino-s-triazine and 3.3 g. (30 mmoles) of 2,3-3-trimethyl-2-butylamine was heated at reflux (oil bath <185° C.) for 21 hours. Thin layer chromatography of a sample of the reaction mixture indicated a mixture of starting material and product in a ratio of 3:7. Heating was terminated and the reaction mixture was treated with excess aqueous NaOH. Filtration afforded a 4.9 g. of crude beige product. This was digested with 15 ml. of hot acetone, filtered and 2.6 g. of beige solid collected, M.P. 278° C. dec. Recrystallization of this product from hot ethanol gave pure product, M.P. 317–321° C. dec.

EXAMPLE 29

Preparation of 2,4,6-tris(2-methyl-2-hexyl)amino-s-triazine

To 3.7 g. (0.02 mole) cyanuric chloride was added 20.7 g. (0.18 mole) of 2-methyl-2-hexylamine and the solution refluxed for 4 hours. Thin layer chromatography indicated disappearance of starting material so the reaction mixture was treated with excess aqueous alkali and extracted into benzene. The benzene extract was dried over anhydrous $MgSO_4$ and concentrated to dryness. The residual gum was partially dissolved in acetone, filtered to remove some insoluble material, and the acetone filtrate concentrated to a pale yellow gum, 7.5 g. This was further purified by chromatography through a silica gel column eluted with $CHCl_3$. Analytically pure product was recovered.

EXAMPLE 30

Preparation of 2,4-bis(2,4,4-trimethyl-2-pentylamino)-6-chloro-s-triazine 18.4 g. (0.10 mole) of cyanuric chloride was slurried in 100 ml. of water and the suspension cooled in an ice bath. Two drops of phenolphthalein solution was added, followed by addition of 32.3 g. (0.25 mole) 2,4,4-trimethyl-2-pentylamino whereupon an exothermic reaction ensued. The suspension was heated with stirring at reflux for a total of 17 hours. During the first half hour a solution of 8.0 g. (0.20 mole) sodium hydroxide in 40 ml. of water was added slowly so as to keep the reaction mixture slightly alkaline. The reaction mixture was cooled, and the aqueous solution decanted from the waxy solid. Acetone was added to the solid and filtered to give 33.3 g. of product, M.P. 164–168° C. Recrystallization from hot ethanol gave 27.5 g. of white needles M.P. 165–167° C.

EXAMPLE 31

Preparation of 2-chloro-4,6-bis(tert-amylamino)-s-triazine 8.1 g. (0.044 mole) cyanuric chloride was slurried in water containing 2 drops of phenolphthalein solution. The tert-amylamine was added and the mixture gradually heated to the boiling point while the sodium hydroxide solution was added dropwise so as to maintain a slightly alkaline solution. The mixture was then heated at reflux for 2 hours and cooled. Filtration afforded 13.48 g. of product, a white solid, M.P. 171–173° C.

EXAMPLE 32

Preparation of 2,4,6-tris(1-methylcyclohexylamino)-s-triazine

A mixture of 5.1 g. (0.015 mole of 2,4-di(1-methylcyclohexylamino)-6-chloro-s-triazine, 3.7 g. (0.033 mole) of 1-methylcyclohexylamine and 4.25 g. (0.045 mole) of α-pyridone is stirred and heated at reflux for 3 hours, forming a homogeneous solution. [The 2,4-bis(1-methylcyclohexylamino) - 6-chloro-s-triazine starting compound was itself prepared from cyanuric chloride and excess 1 - methylcyclohexylamine.] The reaction mixture was poured into 50 ml. of water forming a gum which is triturated with dilute hydrochloric acid to remove unreacted amine. By cooling, the gum is forced out of heptane as a hard glass. The glass is powdered and dried 48 hours in the vacuum oven yielding analytically pure, partially hydrated product.

EXAMPLE 33

Preparation of 2,4,6-tris(cyclohexylamino)-s-triazine

This compound is prepared from cyanuric chloride and cyclohexylamine by heating in xylene for 24 hours; M.P. 220° C.

EXAMPLE 34

Preparation of 2,4-bis(tert-pentylamino)-6-(N-methylcyclohexylamino)-s-triazine

A solution of 5.72 g. (0.02 mole) of 2,4-bis(tert-pentylamino)-6-chloro-s-triazine and 4.98 g. (0.044 mole) of N-methylcyclohexylamine in 150 ml. xylene was refluxed for 16 hours. Ethyl acetate was added to the xylene and the combined solution was washed with water, dried and evaporated to yield 6.6 g. of crude product. Analytically pure product was obtained by recrystallization from ethanol, 5.5 g., M.P. 166–168° C.

EXAMPLE 35

Formulation of $N^2,N^4,N^6$-tris(tert-butyl)melamine

A suspension of $N^2,N^4,N^6$-tri(tert-butyl)melamine is prepared with the following composition:

| | |
|---|---|
| $N^2,N^4,N^6$-tri(tert-butyl)melamine _____ g__ | 31.42 |
| 70% aqueous sorbitol _____ g__ | 714.29 |
| Glycerine U.S.P. _____ g__ | 185.35 |
| Gum acacia (10% solution) _____ ml__ | 100 |
| Polyvinyl pyrrolidone _____ g__ | 0.5 |
| Butyl parahydroxybenzoate _____ g__ | 0.172 |
| Propyl parahydroxybenzoate _____ g__ | 0.094 |
| Water, distilled to make one liter. | |

To this suspension, various sweetening and flavoring agents, as well as acceptable colors, may be added by choice. The suspension contains approximately 25 mg. of $N^2,N^4,N^6$-tri(tert-butyl)melamine per milliliter.

EXAMPLE 36

Formulation of $N^2,N^4,N^6$-tris(tert-pentyl)melamine

A tablet base is prepared by blending the following ingredients in the proportion by weight indicated:

| | |
|---|---|
| Sucrose U.S.P. _____ | 80.3 |
| Tapioca starch _____ | 13.2 |
| Magnesium stearate _____ | 6.5 |

Into this base there is blended sufficient $N^2,N^4,N^6$-tri(tert-pentyl)melamine to provide tablets containing 25, 100 and 250 mg. of active ingredient.

EXAMPLE 37

Formulation of $N^2,N^4,N^6$-tris(2,4,4-trimethyl-2-pentyl)melamine

A blend is prepared containing the following ingredients in the proportion by weight indicated:

| | |
|---|---|
| Calcium carbonate U.S.P. _____ | 17.6 |
| Dicalcium phosphate _____ | 18.8 |
| Magnesium trisilicate U.S.P. _____ | 5.2 |
| Lactose U.S.P. _____ | 5.2 |
| Potato starch _____ | 5.2 |
| Magnesium stearate _____ | 1.15 |

To this blend is added sufficient $N^2,N^4,N^6$-tris(2,4,4-trimethyl-2-pentyl)melamine to provide capsules containing 25,100 and 250 mg. of active ingredient.

We claim:

1. A therapeutic composition in oral dosage unit form useful for the treatment of *Mycobacterium tuberculosis* infections in warm-blooded animals comprising from 0.5 gram to 10.0 grams per daily dosage unit of a compound selected from the group consisting of those of the formula:

wherein $R_1$ is selected from the group consisting of normal alkyl of from 1 to 8 carbon atoms, secondary alkyl of from 4 to 8 carbon atoms, tertiary alkyl of from 4 to 11 carbon atoms, lower cycloalkyl and lower cycloalkyl substituted with from 1 to 3 methyl groups, $R_2$ and $R_3$ are each selected from the group consisting of secondary alkyl of from 4 to 8 carbon atoms, tertiary alkyl of from 4 to 11 carbon atoms, lower cycloalkyl and lower cycloalkyl substituted with from 1 to 3 methyl groups, and the pharmacologically acceptable acid-addition salts thereof; and an edible carrier.

2. A composition according to claim 1 wherein $R_1$, $R_2$ and $R_3$ are tert-butyl.

3. A composition according to claim 1 wherein $R_1$, $R_2$ and $R_3$ are 2,4,4-trimethyl-2-pentyl.

4. A composition according to claim 1 wherein $R_1$, $R_2$ and $R_3$ are 2,3,3-trimethyl-2-butyl.

5. A composition according to claim 1 wherein $R_1$ is methyl and $R_2$ and $R_3$ are 2,4,4-trimethyl-2-pentyl.

6. The method of treating *Mycobacterium tuberculosis* infections in warm-blooded animals which comprises administering orally to said warm-blooded animals an effective amount of a compound selected from the group consisting of those of the formula:

wherein $R_1$ is selected from the group consisting of normal alkyl of from 1 to 8 carbon atoms, secondary alkyl of from 4 to 8 carbon atoms, tertiary alkyl of from 4 to 11 carbon atoms, lower cycloalkyl and lower cycloalkyl substituted with from 1 to 3 methyl groups, $R_2$ and $R_3$ are each selected from the group consisting of secondary alkyl of from 4 to 8 carbon atoms, tertiary alkyl of from 4 to 11 carbon atoms, lower cycloalkyl and lower cycloalkyl substituted with from 1 to 3 methyl groups, and the pharmacologically acceptable acid-addition salts thereof in association with a pharmaceutical carrier to provide a daily dosage of from about 5 to about 200 milligrams per kilogram of body weight of the warm-blooded animal.

7. The method according to claim 6 wherein $R_1$, $R_2$ and $R_3$ are tert-pentyl.

8. The method according to claim 6 wherein $R_1$ is tert-pentyl and $R_2$ and $R_3$ are 2,4,4-trimethyl-2-pentyl.

9. The method according to claim 6 wherein $R_1$, $R_2$ and $R_3$ are 2,3,3-trimethyl-2-butyl.

10. The method according to claim 6 wherein $R_1$, $R_2$ and $R_3$ are 3-ethyl-3-pentyl.

References Cited

UNITED STATES PATENTS

| | | | |
|---|---|---|---|
| 2,691,021 | 10/1954 | Kaiser et al. | 260—249.6 |
| 3,189,521 | 6/1965 | Borkovec et al. | 260—249.6 |
| 3,250,708 | 5/1966 | Dazzi | 260—249.6 |
| 3,422,020 | 1/1969 | Schmadel et al. | 260—249.6 |

JEROME D. GOLDBERG, Primary Examiner